(12) United States Patent
Takatsuji

(10) Patent No.: US 11,329,341 B2
(45) Date of Patent: May 10, 2022

(54) BATTERY PACK

(71) Applicant: Murata Manufacturing Co., Ltd., Nagaokakyo (JP)

(72) Inventor: Hideyasu Takatsuji, Nagaokakyo (JP)

(73) Assignee: MURATA MANUFACTURING CO. LTD., Nagaokakyo (JP)

( * ) Notice: Subject to any disclaimer, the term of this patent is extended or adjusted under 35 U.S.C. 154(b) by 282 days.

(21) Appl. No.: 16/580,037

(22) Filed: Sep. 24, 2019

(65) Prior Publication Data

US 2020/0020904 A1  Jan. 16, 2020

Related U.S. Application Data

(63) Continuation of application No. PCT/JP2018/018383, filed on May 11, 2018.

(30) Foreign Application Priority Data

Jun. 30, 2017  (JP) .............................. JP2017-129568

(51) Int. Cl.
  *H01M 50/20*   (2021.01)
  *H01M 10/04*   (2006.01)
  *H01M 50/209*  (2021.01)
  *H01M 50/531*  (2021.01)

(52) U.S. Cl.
  CPC ....... *H01M 50/20* (2021.01); *H01M 10/0481* (2013.01); *H01M 50/209* (2021.01); *H01M 50/531* (2021.01)

(58) Field of Classification Search
  CPC ............. H01M 10/0481; H01M 50/20; H01M 50/209; H01M 50/531
  See application file for complete search history.

(56) References Cited

U.S. PATENT DOCUMENTS

| 9,425,479 B2 | 8/2016 | Kim |
| 10,249,856 B2 | 4/2019 | Nishikawa et al. |
| 2011/0151312 A1 | 6/2011 | Kim |
| 2016/0141728 A1 | 5/2016 | Fauteux et al. |
| 2017/0110695 A1 | 4/2017 | Nishikawa et al. |

FOREIGN PATENT DOCUMENTS

| JP | 2009259581 A | 11/2009 |
| JP | 2011134699 A | 7/2011 |
| JP | 2015207553 A | 11/2015 |
| JP | 2016537768 A | 12/2016 |
| WO | 2014061335 A1 | 4/2014 |

OTHER PUBLICATIONS

International Search Report issued in PCT/JP2018/018383, dated Jul. 17, 2018.
Written Opinion of the International Searching Authority issued in PCT/JP2018/018383, dated Jul. 17, 2018.

*Primary Examiner* — Sarah A. Slifka
(74) *Attorney, Agent, or Firm* — ArentFox Schiff LLP

(57) ABSTRACT

A battery pack having a plurality of laminated batteries between a pair of restraint plates that each have a battery positioning portion for determining positions of the plurality of laminated batteries and that sandwich the plurality of laminated batteries, and a band around a central portion of a stacked structure of the plurality of laminated batteries and the pair of restraint plates and that fastens the stacked structure at the central portion.

12 Claims, 5 Drawing Sheets

BATTERY PACK

CROSS REFERENCE TO RELATED APPLICATIONS

The present application is a continuation of International application No. PCT/JP2018/018383, filed May 11, 2018, which claims priority to Japanese Patent Application No. 2017-129568, filed Jun. 30, 2017, the entire contents of each of which are incorporated herein by reference.

FIELD OF THE INVENTION

The present invention relates to a battery pack including a laminated battery in which battery elements are accommodated in a laminated case.

BACKGROUND OF THE INVENTION

A laminated battery, in which a battery element is accommodated in a laminated case, is known.

Patent Document 1 describes a battery module having a configuration in which one or a plurality of belt-shaped frames formed in an annular shape are provided in a state where a stacked battery obtained by stacking a plurality of laminated batteries is sandwiched between a pair of protective plates, and a side surface of the stacked battery and part of a surface of the protective plate are covered and fixed with an adhesive tape.

The battery module described in Patent Document 1 has a configuration where, when the laminated battery is expanded due to overcharging or the like, the expanded stacked battery is restrained by the belt-shaped frame, and a portion that is structurally weak, like a heat-welded portion of a laminated case, is broken so that gas accumulated inside can be released.

Patent Document 1: Japanese Patent Application Laid-Open No. 2009-259581

SUMMARY OF THE INVENTION

However, in the battery module of Patent Document 1 described above, it is difficult to accurately position the stacked battery and a pair of the protective plates to have a predetermined positional relationship, and a position shift may occur therebetween. In this case, even if the annular frame is provided at a predetermined position of the protective plate, the frame is provided at a position deviated from a desired position with respect to the stacked battery, and the stacked battery cannot be stably fixed to at a predetermined position due to the annular frame.

The present invention is designed to solve the above-mentioned problem, and an object of the present invention is to provide a battery pack in which positions of a pair of restraint plates and the laminated battery are accurately matched so that the laminated battery can be stably fixed with a belt-shaped fastening member.

A battery pack of the present invention includes a laminated battery in which a battery element is accommodated in a laminated case, a pair of restraint plates that have a battery positioning portion for determining a position of the laminated battery, and are provided on opposed main surfaces of the laminated battery so as to sandwich the laminated battery, and a belt-shaped fastening member around a central portion of a stacked structure of the laminated battery and the pair of restraint plates that fastens the stacked structure integrally at the central portion.

The pair of restraint plates may have an engagement portion for engaging the belt-shaped fastening member.

The engagement portion may be either one of a groove provided around the pair of restraint plates and a through-hole provided in the pair of restraint plates.

Further, the battery positioning portion may be a recess that is provided on a surface of the pair of restraint plates facing the laminated battery, and has a shape corresponding to a shape of the laminated battery.

The laminated battery may have a first electrode tab protruding from the laminated case, and a second electrode tab having polarity different from that of the first electrode tab, and one of the first electrode tab and the second electrode tab may be fixed to one of the pair of restraint plates, and the other one of the first electrode tab and the second electrode tab may be fixed to the other one of the pair of restraint plates in such a manner that a fixing point is released when the laminated battery expands.

The other one of the first electrode tab and the second electrode tab may have a hole that is opened in a direction in which the electrode tab protrudes, and be fixed to the other one of the pair of restraint plates by a male screw penetrating the hole.

A plurality of the laminated batteries may be in the stacked structure.

According to the battery pack of the present invention, a pair of the restraint plates provided on both outer sides of the laminated battery have the battery positioning portion for determining the position of the laminated battery. Accordingly, positions can be matched with excellent accuracy between the laminated battery and a pair of the restraint plate, and the central portion of the laminated battery can be stably fixed by the belt-shaped fastening member.

DETAILED DESCRIPTION OF THE INVENTION

Hereinafter, an embodiment of the present invention will be shown to explain characteristics of the present invention more specifically.

Figure 1:
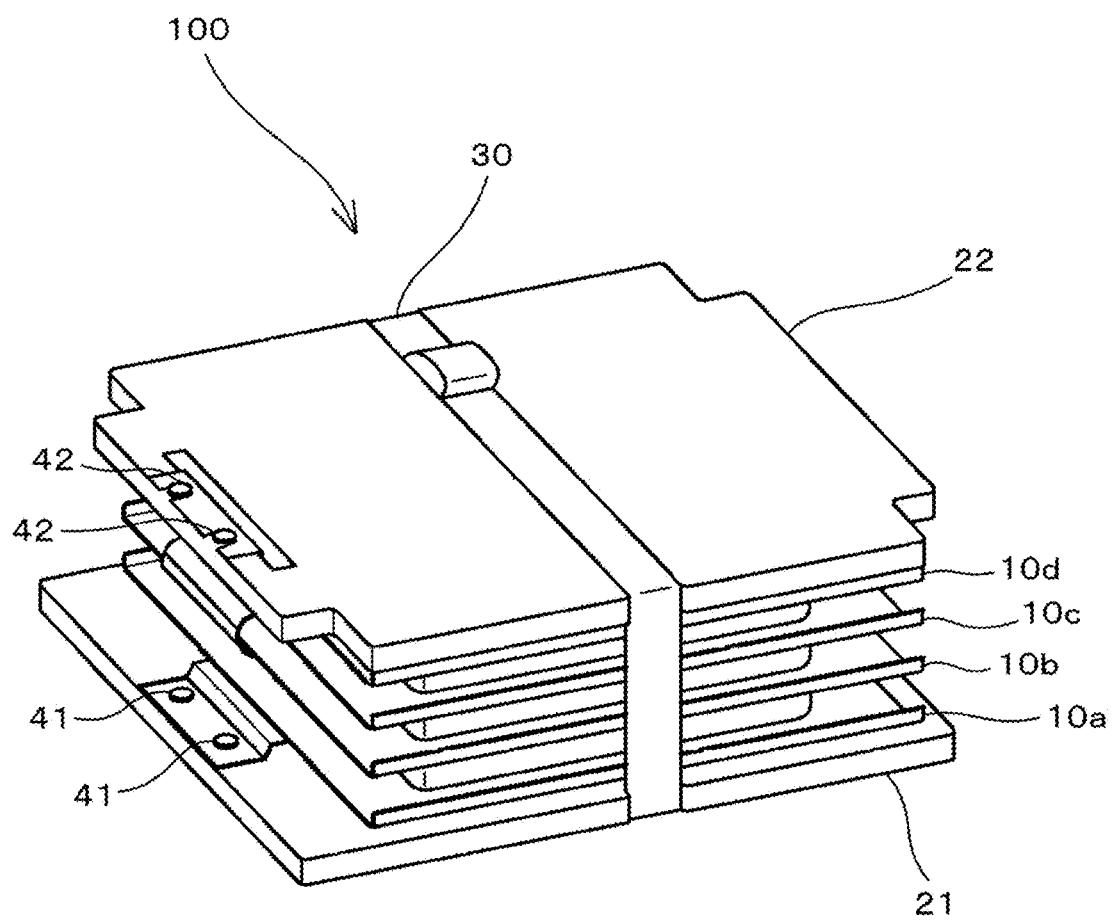
FIG. 1 is a perspective view of a battery pack according to an embodiment.
Figure 2:
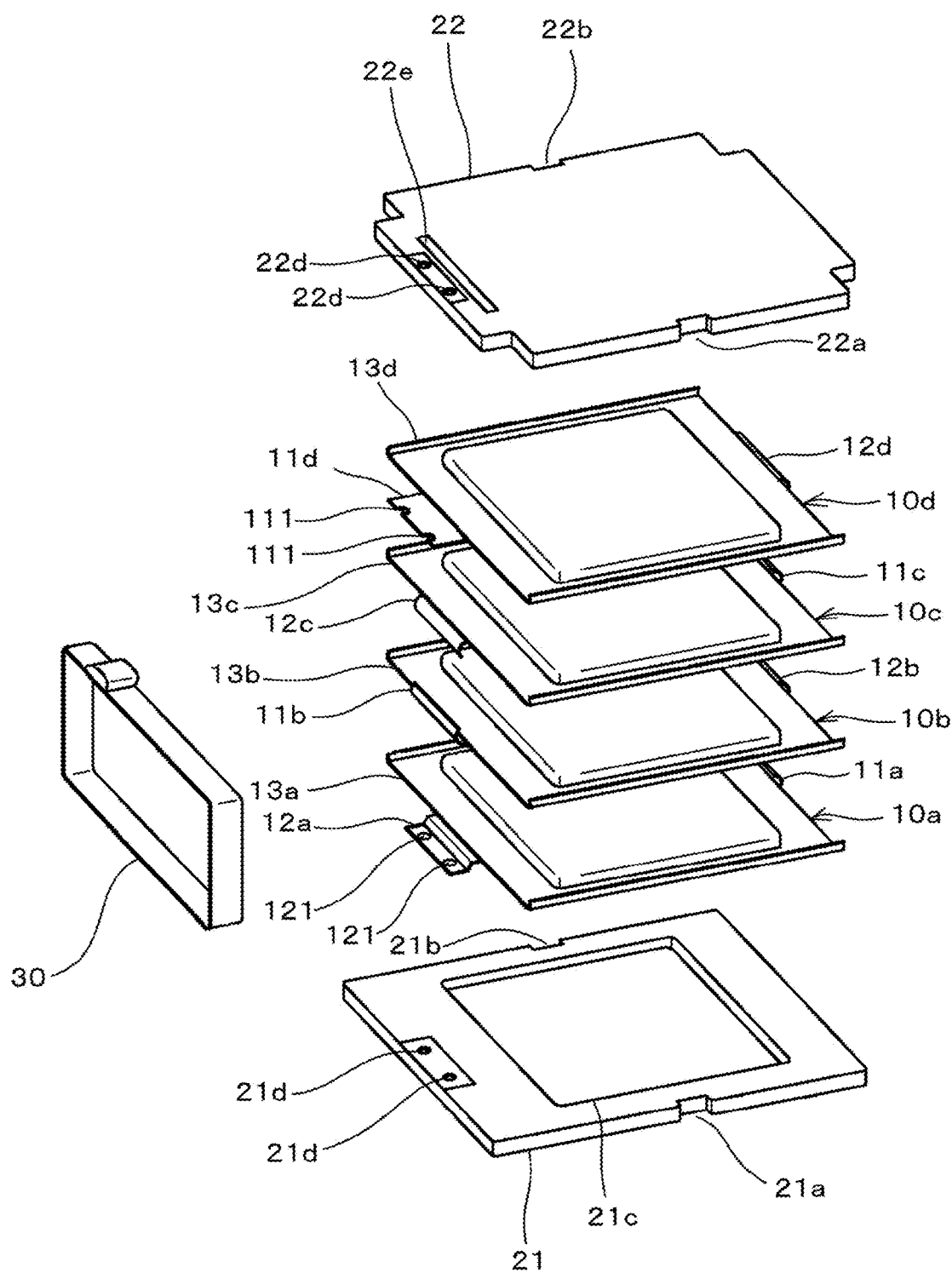
FIG. 2 is an exploded view of the battery pack illustrated in FIG. 1.

FIG. 1 is a perspective view of a battery pack 100 according to one embodiment. Further, FIG. 2 is an exploded view of the battery pack 100 illustrated in FIG. 1.

The battery pack 100 according to one embodiment includes a plurality of stacked laminated batteries 10 (10a, 10b, 10c, and 10d), a first restraint plate 21 and a second restraint plate 22, which together are a pair of restraint plates, provided to sandwich the plurality of laminated batteries 10 on both outer sides in a stacking direction of the plurality of laminated batteries 10, and a band 30 that is provided around a central portion of a stacked structure of the plurality of laminated batteries 10 and the first restraint plate 21 and the second restraint plate 22 to integrally fasten the stacked structure at the central portion.

Note that, in the present description, the laminated batteries 10a, 10b, 10c, and 10d will be described as the laminated battery 10 when they are described without distinction.

The laminated battery 10 is, for example, a lithium-ion secondary battery. However, the laminated battery 10 is not limited to a lithium-ion secondary battery.

The laminated battery 10 has a structure in which a battery element is accommodated in a laminated case 13 (13a, 13b, 13c, 13d). The battery element includes, for example, a positive electrode, a negative electrode, and an electrolyte. Further, the laminated case 13 is formed of a laminate film.

From the laminated case 13 of the laminated battery 10, a positive electrode tab 11 (11a, 11b, 11c, 11d) connected to the positive electrode, and a negative electrode tab 12 (12a, 12b, 12c, 12d) connected to the negative electrode protrude outside.

In the present embodiment, the first laminated battery 10a, the second laminated battery 10b, the third laminated battery 10c, and the fourth laminated battery 10d are stacked. The first laminated battery 10a is located in the lowermost layer, and the fourth laminated battery 10d is located in the uppermost layer. The laminated batteries 10 adjacent to each other in the stacking direction are adhered to each other using, for example, a double-sided tape or an adhesive.

In the present embodiment, the first laminated battery 10a, the second laminated battery 10b, the third laminated battery 10c, and the fourth laminated battery 10d are connected in series. That is, the first positive electrode tab 11a of the first laminated battery 10a and the second negative electrode tab 12b of the second laminated battery 10b are connected, and the second positive electrode tab 11b of the second laminated battery 10b is connected to the third negative electrode tab 12c of the third laminated battery 10c. Further, the third positive electrode tab 11c of the third laminated battery 10c is connected to the fourth negative electrode tab 12d of the fourth laminated battery 10d.

The first negative electrode tab 12a of the first laminated battery 10a is fixed to the first restraint plate 21. Further, the fourth positive electrode tab 11d of the fourth laminated battery 10d is fixed to the second restraint plate 22 by a method described later.

Figure 3:
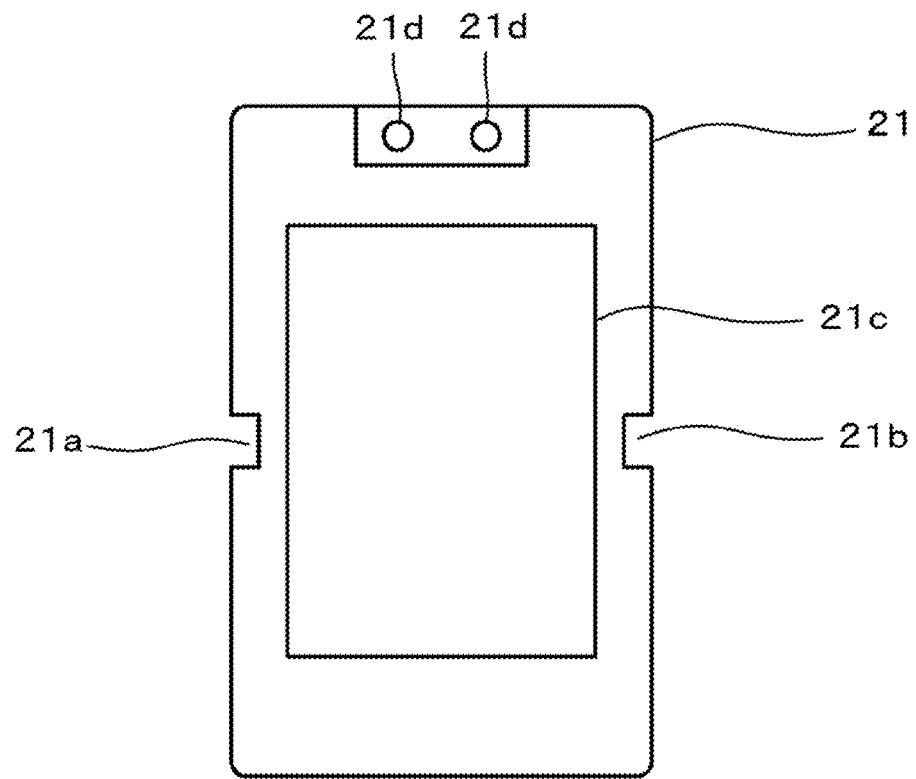
FIG. 3 is a plan view of an inner surface of a first restraint plate.
Figure 4:
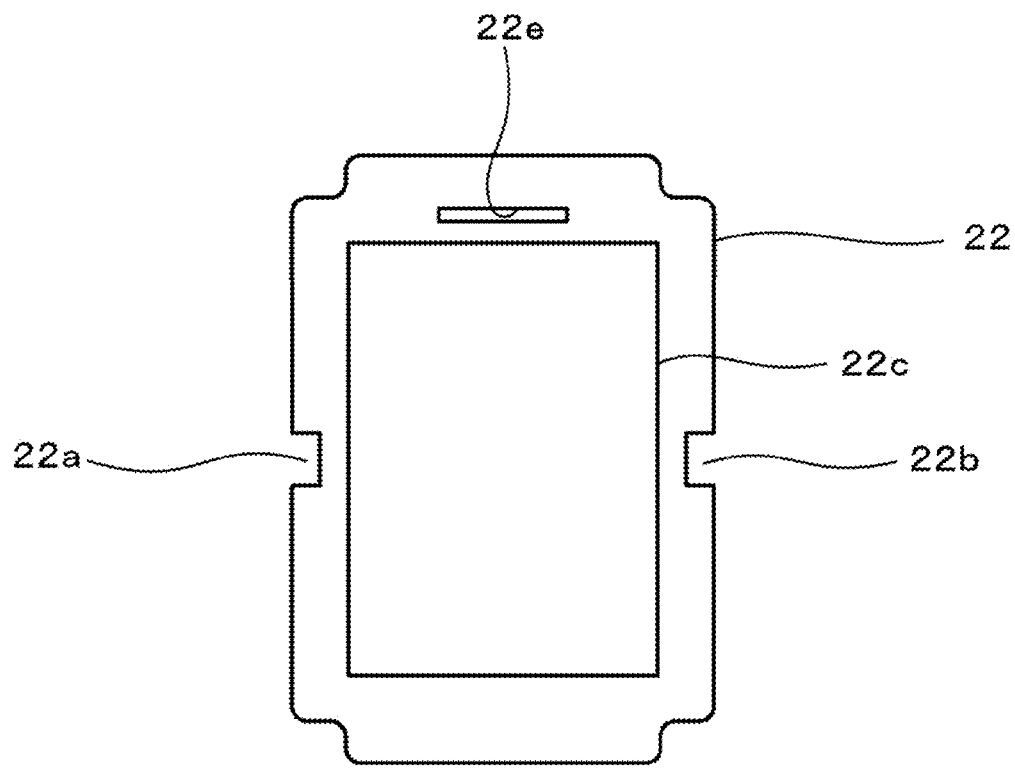
FIG. 4 is a plan view of an inner surface of a second restraint plate.

FIG. 3 is a plan view of an inner surface of the first restraint plate 21, that is, a surface facing the first laminated battery 10a. Further, FIG. 4 is a plan view of an inner surface of the second restraint plate 22, that is, a surface facing the fourth laminated battery 10d.

The first restraint plate 21 and the second restraint plate 22 have flexibility that allows a certain degree of deformation, and are formed of, for example, resin. However, a forming material of the first restraint plate 21 and the second restraint plate 22 is not limited to resin.

The first restraint plate 21 is provided with a first engagement groove 21a and a second engagement groove 21b that function as an engagement portion with which the band 30 engages. The first engagement groove 21a and the second engagement groove 21b are provided at the center position in a longitudinal direction in the periphery of the first restraint plate 21.

On an inner surface of the first restraint plate 21, a first recess 21c having a shape corresponding to a shape of the first laminated battery 10a is provided. The first recess 21c functions as a battery positioning portion for determining the position of the first laminated battery 10a and is provided at the center of the first restraint plate 21. With such a configuration, the first laminated battery 10a is fixed at the central position of the first restraint plate 21, that is, the position where the first recess 21c is provided.

In the present embodiment, the first recess 21c has a shape corresponding to a shape of a portion in which a battery element is enclosed in the first laminated battery 10a. In the present embodiment, the shape of the portion in which a battery element of the first laminated battery 10a is enclosed is rectangular in plan view, and the first recess 21c also has a rectangular shape in plan view.

The second restraint plate 22 is provided with a third engagement groove 22a and a fourth engagement groove 22b that function as an engagement portion with which the band 30 engages. The third engagement groove 22a and the fourth engagement groove 22b are provided at the center position in a longitudinal direction in the periphery of the second restraint plate 22.

On an inner surface of the second restraint plate 22, a second recess 22c having a shape corresponding to a shape of the fourth laminated battery 10d is provided. The second recess 22c functions as a battery positioning portion for determining the position of the fourth laminated battery 10d and is provided at the center of the second restraint plate 22. With such a configuration, the fourth laminated battery 10d is fixed at the central position of the second restraint plate 22, that is, the position where the second recess 22c is provided.

In the present embodiment, the second recess 22c has a shape corresponding to a shape of a portion in which a battery element is enclosed in the fourth laminated battery 10d. In the present embodiment, the shape of the portion in which a battery element of the fourth laminated battery 10d is enclosed is rectangular in plan view, and the second recess 22c also has a rectangular shape.

As described above, the first recess 21c is provided on the first restraint plate 21 and the second recess 22c is provided on the second restraint plate 22, so that positional relationships between the stacked laminated battery 10 and the first restraint plate 21 and the second restraint plate 22 can be matched with excellent accuracy.

Further, by the configuration in which the stacked laminated battery 10 is sandwiched between the first restraint plate 21 and the second restraint plate 22 which are flat plates, an outer surface of the battery pack 100 becomes flat, so that installation property when the battery pack 100 is installed in an electronic device or vehicle is improved.

The band 30 functioning as a band-shaped fastening member is an annular and belt-shaped member, and is configured such that a circumferential length of an annular portion can be adjusted. The band 30 is made from, for example, stainless steel. However, the material of the band 30 is not limited to stainless steel, and other types of metal may be used, or a material other than metal may be used. A width of the band 30 is, for example, 8 mm (about 10% of the length of the laminated battery 10).

The band 30 is engaged with the first engagement groove 21a and the second engagement groove 21b of the first restraint plate 21 and the third engagement groove 22a and the fourth engagement groove 22b of the second restraint plate 22, and is provided to surround a plurality of stacked laminated batteries 10 and the first restraint plate 21 and the second restraint plate 22. That is, the band 30 is provided around the central portion of the stacked structure of the laminated battery 10 and the first restraint plate 21 and the second restraint plate 22 from one side of a pair of the restraint plates 21 and 22 to the other side to fasten the stacked structure at its central portion integrally.

As described above, the first engagement groove 21a and the second engagement groove 21b are provided at central positions in the longitudinal direction of the periphery of the first restraint plate 21, and the third engagement groove 22a and the fourth engagement groove 22b are provided at central positions in the longitudinal direction of the periphery of the second restraint plate 22. Therefore, the band 30 integrally fixes a plurality of stacked laminated batteries 10, the first restraint plate 21, and the second restraint plate 22 at the central position of the first restraint plate 21 and the second restraint plate 22.

At the time of manufacture of the battery pack 100, the band 30 is caused to be engaged with the first engagement groove 21a and the second engagement groove 21b of the first restraint plate 21 and the third engagement groove 22a and the fourth engagement groove 22b of second restraint plate 22, and is tightened with a predetermined force, so that the stacked laminated battery 10 and the first restraint plate 21 and the second restraint plate 22 are fixed.

As described above, since the band 30 is configured to be able to adjust the circumferential length of the annular portion, even in a case where there is variation in the thickness of the laminated battery 10, the stacked laminated battery 10, and the first restraint plate 21 and the second restraint plate 22 can be fixed with a predetermined binding force.

Here, a method of fixing the first negative electrode tab 12a of the first laminated battery 10a and the fourth positive electrode tab 11d of the fourth laminated battery 10d will be described.

The first negative electrode tab 12a of the first laminated battery 10a is provided with two circular holes 121 through which two first male screws 41 (see FIG. 1) pass (see FIG. 2). Further, the first restraint plate 21 is provided with two circular screw holes 21d engaged with the two first male screws 41. That is, the first negative electrode tab 12a of the first laminated battery 10a is fixed to the first restraint plate 21 by two of the first male screws 41.

However, the method of fixing the first negative electrode tab 12a of the first laminated battery 10a to the first restraint plate 21 is not limited to the fixing method using two of the first male screws 41. Further, in a case where the first negative electrode tab 12a of the first laminated battery 10a is fixed using the first male screw 41, the number of the first male screws 41 used is not limited to two.

Note that, as the first male screw 41, an existing male screw can be used. The existing male screw also includes a bolt.

As shown in FIG. 4, the second restraint plate 22 is provided with a tab insertion hole 22e through which the fourth positive electrode tab 11d of the fourth laminated battery 10d is inserted. The fourth positive electrode tab 11d of the fourth laminated battery 10d is inserted through the tab insertion hole 22e and fixed on an outer surface of the second restraint plate 22 in such a manner that the fixing location is released when the laminated battery 10 expands.

Specifically, in the fourth positive electrode tab 11d of the fourth laminated battery 10d, two U-shaped holes 111 opened in a direction in which the fourth positive electrode tab 11d protrudes from the fourth laminated battery 10d are provided (see FIG. 2). Further, on the outer surface of the second restraint plate 22, two circular screw holes 22d which are engaged with two second male screws 42 (see FIG. 1) are provided (see FIG. 2). The two second male screws 42 pass through two of the U-shaped holes 111 provided on the fourth positive electrode tab 11d of the fourth laminated battery 10d, and are engaged with the circular screw holes 22d on the second restraint plate 22.

Note that, as the second male screw 42, an existing male screw can be used. The existing male screw also includes a bolt.

Figure 5A:
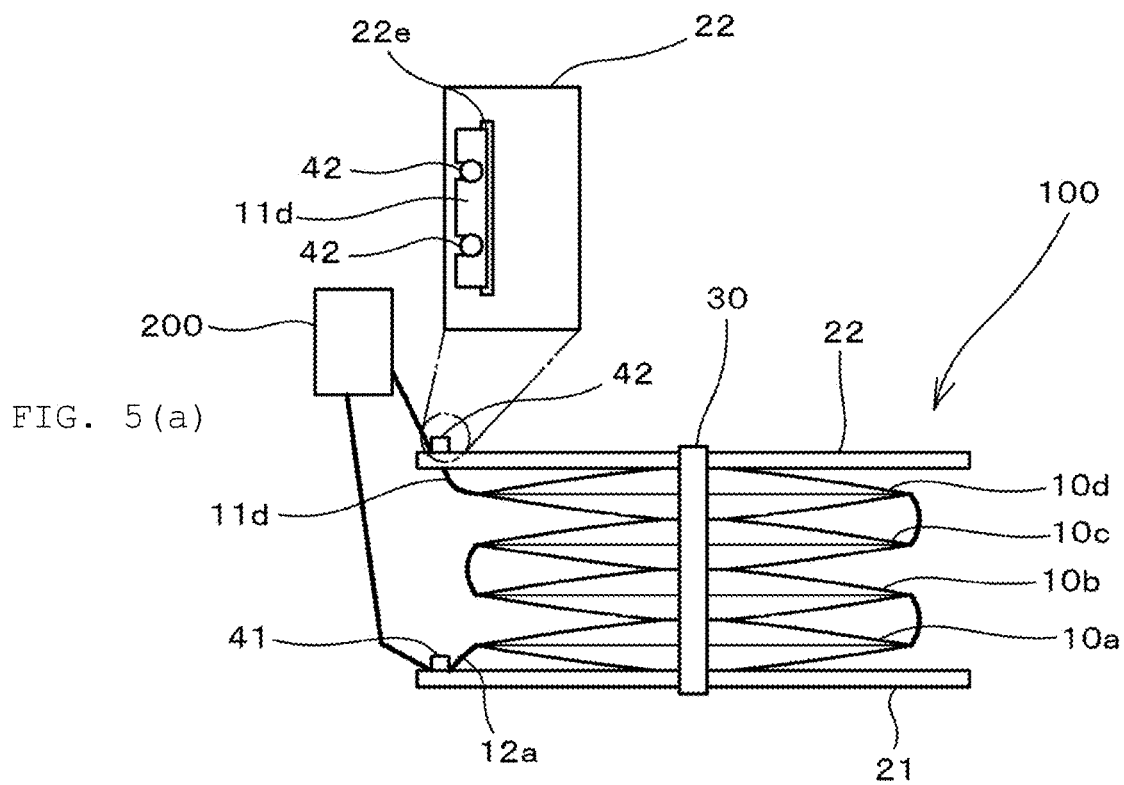
FIGS. 5(*a*) and 5(*b*) are schematic views for explaining operation when a laminated battery is expanded from a normal state, where FIG. 5(*a*) is a side view showing a state where the battery pack in one embodiment is connected to a load, and FIG. 5(*b*) is a diagram illustrating a state which the laminated battery expanded from the state illustrated in FIG. 5(*a*).
Figure 5B:
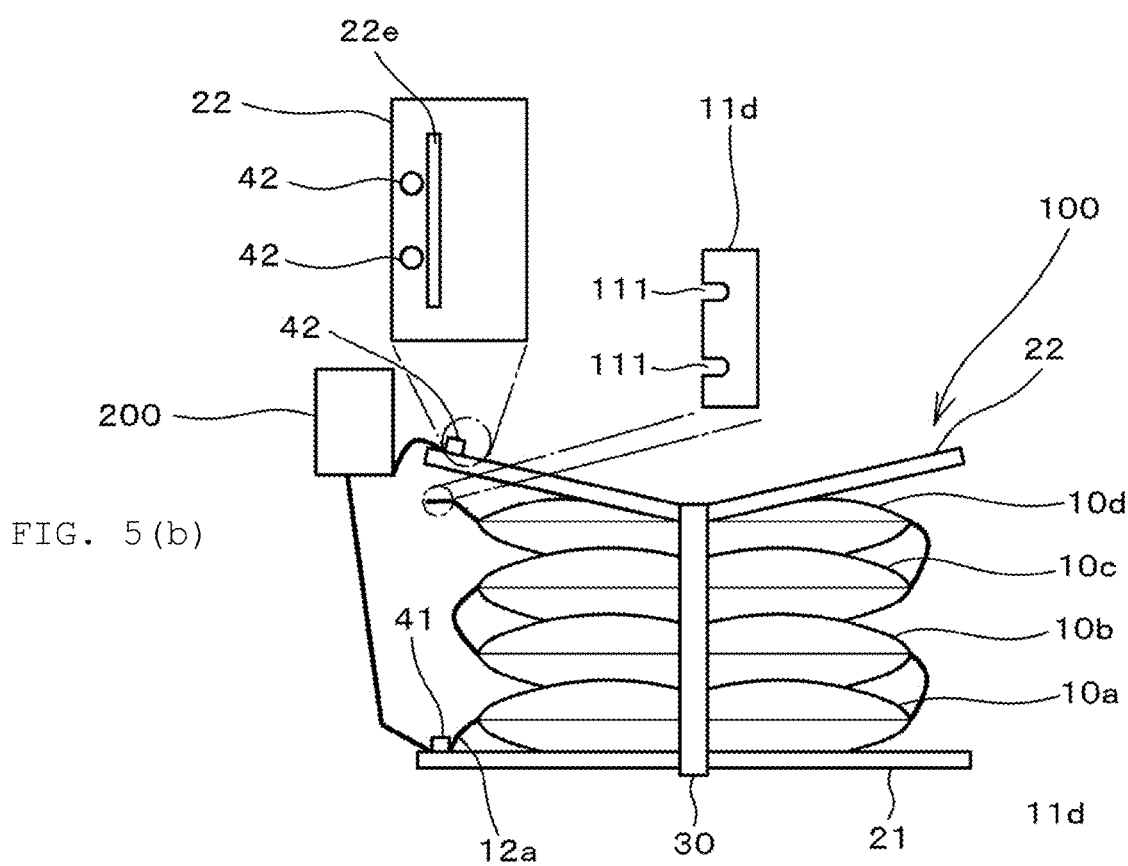

FIG. 5 is a schematic view for explaining operation when the laminated battery 10 is expanded from the normal state. FIG. 5(a) is a side view showing a state in which the battery pack 100 in the present embodiment is connected to a load 200, and FIG. 5(b) is a diagram illustrating a state in which the laminated battery 10 expands from the state shown in FIG. 5(a). FIGS. 5(a) and 5(b) also illustrate a plan view of the position where the fourth positive electrode tab 11d of the fourth laminated battery 10d is fixed.

When decomposition gas of an electrolytic solution is generated at the time of an abnormality, such as an overcharge or an internal short circuit, the laminated battery 10 expands. At this time, since the central portion of the laminated battery 10 is fixed by the band 30, both sides of the central portion fixed by the band 30 expand. Further, since the first negative electrode tab 12a of the first laminated battery 10a is fixed to the first restraint plate 21, when the laminated battery 10 expands, an end of the second restraint plate 22 is lifted upward around a position fixed by the band 30 as shown in FIG. 5(b).

As described above, the U-shaped hole 111 provided in the fourth positive electrode tab 11d of the fourth laminated battery 10d is opened in the direction in which the fourth positive electrode tab 11d protrudes, that is, on an outer side. For this reason, when the end of the second restraint plate 22 is lifted upward, engagement between the fourth positive electrode tab 11d and the second male screw 42 is released in a state where the second male screw 42 is engaged with the second restraint plate 22. In this manner, the load 200 is electrically disconnected from the battery pack 100.

As described above, according to the battery pack 100 in the present embodiment, an electrical connection can be disconnected when an expansion abnormality of the laminated battery 10 occurs, without the need of separately providing an expansion detection device for the laminated battery 10, or a disconnection mechanism for disconnecting the electrical connection when the expansion abnormality occurs in the laminated battery 10. That is, when the expansion abnormality of the laminated battery 10 occurs, the electrical connection can be disconnected safely and at low cost.

Further, as described above, in the battery pack 100 in the present embodiment, the first restraint plate 21 is provided with the first recess 21c having a shape corresponding to the shape of the first laminated battery 10a, and the second restraint plate 22 is provided with the second recess 22c having a shape corresponding to the shape of the fourth laminated battery 10d. In this manner, the positional relationships between the stacked laminated battery 10 and the first restraint plate 21 and the second restraint plate 22 can be matched with excellent accuracy.

In particular, even in a case where positional relationships between the first restraint plate 21 and the second restraint plate 22 and a plurality of stacked laminated batteries 10 are deviated when the stacked laminated batteries 10 are sandwiched between the first restraint plate 21 and the second restraint plate 22 in a manufacturing process of the battery pack 100, the band 30 is tightened with a predetermined force when the band 30 is provided after the above, so that the first laminated battery 10a fits in the first recess 21c of the first restraint plate 21, and the fourth laminated battery 10d fits in the second recess 22c of the second restraint plate 22. As described above, at the time of manufacturing the battery pack 100, the positional relationships between the stacked laminated battery 10 and the first restraint plate 21 and the second restraint plate 22 can be corrected, and positions can be matched with excellent accuracy.

Further, the first engagement groove 21a and the second engagement groove 21b for engaging the band 30 are provided at the central portion in the longitudinal direction of the first restraint plate 21, and the third engagement groove 22a and the fourth engagement groove 22b for engaging the band 30 are provided at the central portion in the longitudinal direction of the second restraint plate 22. Accordingly, the band 30 can be fixed with excellent accuracy at the central portion in the longitudinal direction of the first restraint plate 21 and the second restraint plate 22.

Here, each of the laminated batteries 10 may have a different thickness since the laminated case 13 is soft and due to manufacturing variations and the like. For this reason, in the battery pack 100 in which a plurality of laminated batteries 10 are laminated, the variation in thickness in the laminating direction of the laminated batteries 10 is likely to occur. However, in the battery pack 100 according to the present embodiment, the first restraint plate 21 and the second restraint plate 22 are provided on both outer sides of the stacked laminated battery 10, and the outer sides are fixed with a certain fastening force using the band 30. Accordingly, even in a case where the total thickness of the stacked laminated battery 10 is different, the entire stacked laminated battery 10 can be fixed stably with a certain binding force.

Further, in the laminated battery 10, the laminated case 13 is soft and has the property of swelling around the center. Accordingly, by fixing the central portion with one of the band 30, the load balance on both sides of a position at which the band 30 is provided can be maintained when the band 30 is fastened, and the laminated battery 10 can be stably fixed.

Note that, in a case where the stacked laminated battery 10 is fixed using two or more bands, a fastening force of each band may not be uniform due to the order of fastening of the bands. In this case, stress is concentrated on one of the bands and a loose band is generated, which makes it impossible to stably fix the laminated battery 10.

Further, as in the battery pack 100 according to the present embodiment, even in the configuration in which a plurality of laminated batteries 10 are stacked, positions are matched with excellent accuracy between a plurality of stacked laminated batteries 10 and the first restraint plate 21 and the second restraint plate 22, and the central portions of a plurality of stacked laminated batteries 10 can be stably fixed by the band 30 with a certain binding force.

The present invention is not limited to the above embodiment, and various applications and variations can be applied within the scope of the present invention.

For example, although it has been described that the first restraint plate 21 is provided with the first engagement groove 21a and the second engagement groove 21b which function as an engagement portion for engaging the band 30, the configuration may be such that a band through-hole is provided as an engagement portion for engaging the band 30. Similarly, the configuration may be such that the second restraint plate 22 is provided with a band through-hole as an engagement portion for engaging the band 30.

Figure 6A:
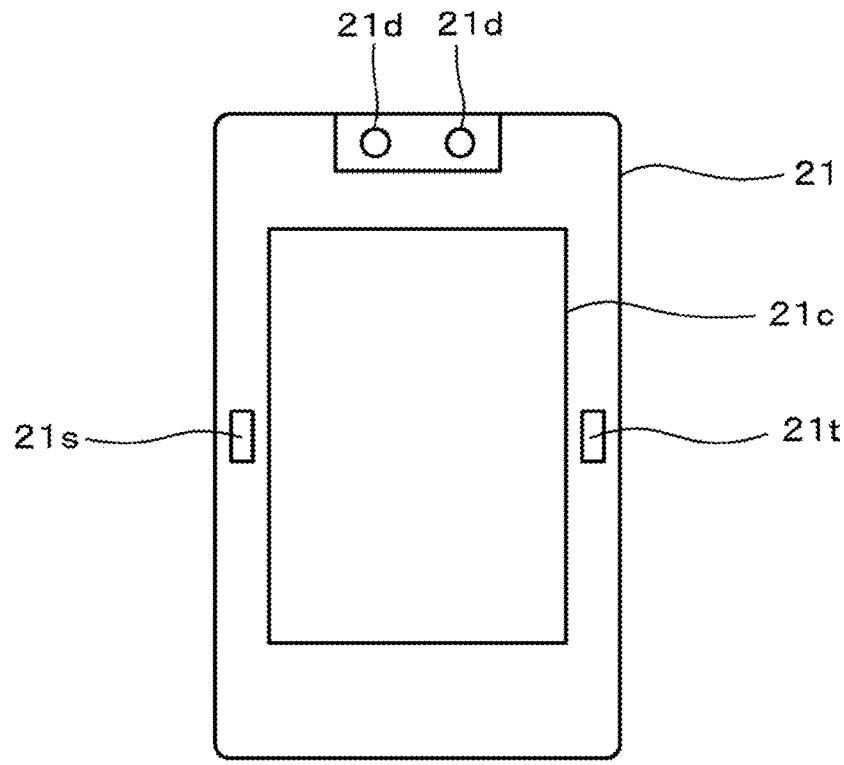
FIG. 6(*a*) is a plan view illustrating an inner surface of the first restraint plate provided with a first band through-hole and a second band through-hole as an engagement portion with which a band engages, and FIG. 6(*b*) is a plan view illustrating an inner surface of the second restraint plate provided with a third band through-hole and a fourth band through-hole as an engagement portion with which a band engages.

FIG. 6(a) is a plan view of an inner surface of the first restraint plate 21 provided with a first band through-hole 21s and a second band through-hole 21t as an engagement portion for engaging the band 30. The first band through-hole 21s and the second band through-hole 21t are provided at the central position in the longitudinal direction and between the end of the first restraint plate 21 and the first recess 21c.

Figure 6B:
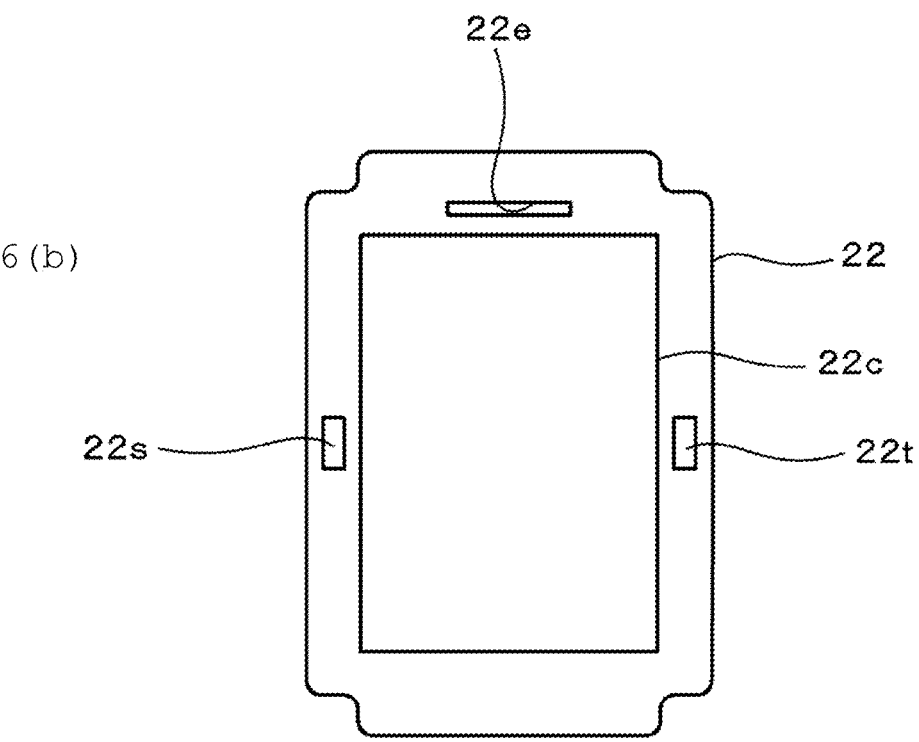

FIG. 6(b) is a plan view of an inner surface of the second restraint plate 22 provided with a third band through-hole 22s and a fourth band through-hole 22t as an engagement portion for engaging the band 30. The third band through-hole 22s and the fourth band through-hole 22t are provided at the central position in the longitudinal direction and between the end of the second restraint plate 22 and the second recess 22c.

Also in such a configuration, the central portion of the laminated battery 10 sandwiched by the first restraint plate 21 and the second restraint plate 22 can be fixed with the band 30 with excellent accuracy.

In the embodiment described above, although a plurality of laminated batteries 10 are described as being stacked, the number of the laminated battery 10 may be one. In that case, the first restraint plate 21 and the second restraint plate 22 which are a pair of restraint plates are configured to be provided on both outer sides in the direction in which a pair of main surfaces of the laminated battery 10 face each other.

In the embodiment described above, the first restraint plate 21 is described as having the first recess 21c formed as a battery positioning portion for determining the position of the first laminated battery 10a. However, the battery positioning portion may have a configuration other than the recess, for example, a protrusion for determining the position of the first laminated battery 10a. Similarly, the battery positioning portion of the second restraint plate 22 is not limited to a recess such as the second recess 22c, and may be a protrusion.

The shape of the hole 111 which is provided on the fourth positive electrode tab 11d of the fourth laminated battery 10d and has an opened outer side is not limited to the U shape, and may be, for example, a V shape.

DESCRIPTION OF REFERENCE SYMBOLS

10a: First laminated battery
10b: Second laminated battery
10c: Third laminated battery
10d: Fourth laminated battery
11a: First positive electrode tab
11b: Second positive electrode tab
11c: Third positive electrode tab
11d: Fourth positive electrode tab
12a: First negative electrode tab
12b: Second negative electrode tab
12c: Third negative electrode tab
12d: Fourth negative electrode tab
21: First restraint plate
21a: First engagement groove 21b: Second engagement groove
21c: First recess
21s: First band through-hole
21t: Second band through-hole
22: Second restraint plate
22a: Third engagement groove
22b: Fourth engagement groove
22c: Second recess
22s: Third band through-hole
22t: Fourth band through-hole
30: Band
41: First male screw
42: Second male screw
100: Battery pack
111: U-shaped hole provided on positive electrode tab
121: Circular hole provided on negative electrode tab
200: Load

The invention claimed is:

1. A The battery pack comprising:
at least one laminated battery having a battery element accommodated in a laminated case;
a first restraint plate having a first battery positioning portion for determining a position of the laminated battery;
a second restraint plate having a second battery positioning portion for determining the position of the laminated battery, the first restraint plate and the second restrain plate positioned on respective opposed outer of main surfaces of the laminated battery face so as to face each other and sandwich the laminated battery; and
a belt-shaped fastening member provided around a central portion of a stacked structure of the laminated battery and the first and second restraint plates so as to fasten the stacked structure integrally at the central portion, wherein
the laminated battery has a first electrode tab protruding from the laminated case, and a second electrode tab having polarity different from that of the first electrode tab, and
the first electrode tab is fixed to one of the first restraint plate, and the second electrode tab is fixed to the second restraint plate in such a manner that a fixing point is released when the laminated battery expands.

2. The battery pack according to claim 1, wherein the first and second restraint plates each have an engagement portion for engaging the belt-shaped fastening member.

3. The battery pack according to claim 2, wherein the engagement portion is a groove within a periphery of the first and second restraint plates.

4. The battery pack according to claim 3, wherein the first and second battery positioning portions are a recess on a respective surface of the first and second restraint plates facing the laminated battery, the recess having a shape corresponding to a shape of the laminated battery.

5. The battery pack according to claim 2, wherein the engagement portion is a through-hole in the first and second restraint plates.

6. The battery pack according to claim 5, wherein the first and second battery positioning portions are a recess on a respective surface of the first and second restraint plates facing the laminated battery, the recess having a shape corresponding to a shape of the laminated battery.

7. The battery pack according to claim 2, wherein the first and second battery positioning portions are a recess on a respective surface of the first and second restraint plates facing the laminated battery, the recess having a shape corresponding to a shape of the laminated battery.

8. The battery pack according to claim 1, wherein the first and second battery positioning portions are a recess on a respective surface of the first and second restraint plates facing the laminated battery, the recess having a shape corresponding to a shape of the laminated battery.

9. The battery pack according to claim 1, wherein the second electrode tab has a hole that is opened in a direction in which the electrode tab protrudes.

10. The battery pack according to claim 1, wherein the second restraint plate includes a tab insertion hole through which the second electrode tab extends.

11. The battery pack according to claim 9, wherein the second restraint plate includes a tab insertion hole through which the second electrode tab extends.

12. The battery pack according to claim 1, wherein the at least one laminated battery is a plurality of laminated batteries that are stacked between the first and second restraint plates.

* * * * *